United States Patent [19]

Blewett et al.

[11] Patent Number: 4,867,195

[45] Date of Patent: Sep. 19, 1989

[54] VAPOR PRESSURE CONTROL SYSTEM

[75] Inventors: Michael Blewett, Rockford, Ill.; Thomas Nelson, San Diego, Calif.

[73] Assignee: Sundstrand Corporation, Rockford, Ill.

[21] Appl. No.: 162,135

[22] Filed: Feb. 29, 1988

[51] Int. Cl.[4] .............................................. G05D 16/00

[52] U.S. Cl. ................................. 137/206; 137/487.5; 137/613

[58] Field of Search ..................... 137/209, 206, 487.5, 137/488, 210, 468, 613; 236/49 C; 98/1.5; 62/55

[56] References Cited

U.S. PATENT DOCUMENTS

| | | | |
|---|---|---|---|
| 2,790,307 | 4/1957 | Ayres . | |
| 3,092,972 | 6/1963 | Poorman et al. . | |
| 3,124,937 | 3/1964 | King . | |
| 3,134,237 | 5/1964 | Canty et al. . | |
| 3,537,380 | 11/1970 | Spralding | 236/49 C X |
| 3,593,735 | 7/1971 | Reiker | 98/1.5 X |
| 3,809,314 | 5/1974 | Engelke | 236/49 C |
| 4,061,266 | 12/1977 | Ley | 236/49 C |
| 4,487,025 | 12/1984 | Hamid . | |
| 4,593,529 | 6/1986 | Birochik . | |
| 4,617,958 | 10/1986 | Seidel | 137/488.1 |
| 4,639,262 | 1/1987 | Heichberger . | |
| 4,646,525 | 3/1987 | Delacour et al. . | |

*Primary Examiner*—Alan Cohan
*Attorney, Agent, or Firm*—Wood, Dalton, Phillips, Mason & Rowe

[57] ABSTRACT

A pressure control system for a storage tank, including a supply of working fluid under pressure. A conduit establishes fluid communication between the supply and the storage tank. A supply regulator is provided in the conduit for maintaining a substantially constant pressure to the storage tank. A tank regulator is provided in the conduit between the supply regulator and the storage tank for selectively admitting the substantially constant pressure as a function of temperature to the storage tank. A control selectively operates the tank regulator in response to given conditions, such as temperature conditions, in the storage tank.

15 Claims, 1 Drawing Sheet

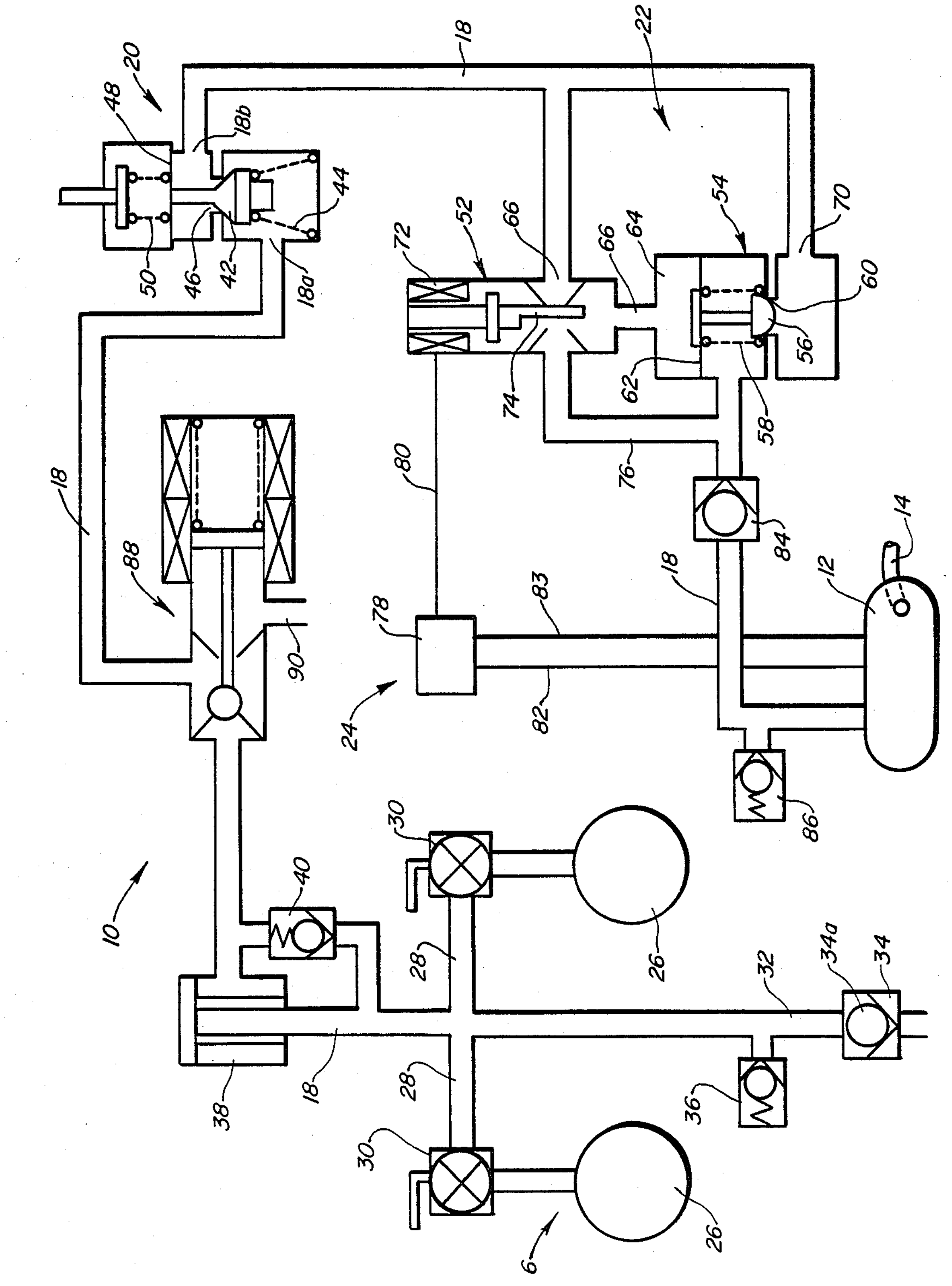
18
22
20
48
18b
44
42
46
50
18a
72
52
66
66
64
54
70
60
56
62
74
58
76
80
18
84
14
12
88
90
78
83
82
24
18
86
30
26
40
10
28
32
34a
34
38
18
28
36
30
26
6

VAPOR PRESSURE CONTROL SYSTEM

FIELD OF THE INVENTION

This invention generally relates to a pressure control system and, particularly, to a pressure regulating system for a storage tank or the like which maintains a fluid in a tank in a liquid state.

BACKGROUND AND SUMMARY OF THE INVENTION

There are various applications where it is necessary to maintain a pressure on a fluid in a storage tank to maintain it in the liquid state for pumping purposes. The requirement becomes necessary when it is desirable to pump fluids which are volatile in nature within the ambient temperatures of the application. The fluid, which is contained in a tank, requires a certain minimum pressure to remain in a liquid state at a given temperature. The required pressure depends on the vapor pressure of the fluid which, in turn, is a function of temperature. Such gases as nitrogen can be supplied to the tank, under pressure, to maintain the given or required pressure of the fluid to maintain it in the liquid state.

There is a need for an improved pressure control system for such storage tanks which can be readily regulated as a function of the tank temperature. This invention is directed to solving such a need. Its advantage over a simplistic system of a constant supply regulator, which is set to a point above all vapor pressures of the fluid, is in pressurization gas consumption and potential contamination. In a system with a working fluid which is exposed to a wide range of ambient temperatures, such as in aircraft usage, and a fluid with a wide range of vapor pressures over those ambients, the required constant pressure would be significantly higher than that required for a majority of conditions. This higher than needed pressure can, dependent on the fluids involved, result in a higher absorption rate and potential unacceptable contamination of the pressurization gas into the liquid to be pumped. This simplistic approach also will require a larger volume of pressurization gas which would be disadvantageous in aircraft applications due to weight and size constraints.

An object, therefore, of the invention is to provide a new and improved control system for maintaining a fluid in a liquid state throughout a varying temperature range with minimized pressurizing gas consumption in a storage tank or the like.

In the exemplary embodiment of the invention, a supply of pressurization (gas) fluid, such as nitrogen, is provided under a pressure at least above that required to be maintained in the storage tank. Generally, conduit means establishes fluid communication between the working fluid supply and the storage tank. Supply regulator means are provided in the conduit means for maintaining a substantially constant pressure to the storage tank. Tank regulator means are provided in the conduit means between the supply regulator means and the storage tank for selectively admitting the substantially constant pressure to the storage tank. Control means are provided for selectively operating the tank regulator means in response to given conditions, such as the temperature condition, present in the storage tank.

As disclosed herein, the supply regulator means is a differential pressure valve. The tank regulator means includes a second differential pressure valve, along with a flapper valve for selectively admitting the constant pressure to the differential pressure valve. Control means, responsive to temperature conditions in the storage tank, are operatively connected to the flapper valve for controlling the tank regulator means to maintain a given pressure in the storage tank.

Other objects and features of the invention will be apparent from the following detailed description taken in connection with the accompanying drawings.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawing, in which the single figure is a somewhat schematic illustration of the pressure control system of the invention.

DETAILED DESCRIPTION OF THE PREFERRED EMBODIMENT

Referring to the drawing in greater detail, a vapor pressure control system, generally designated 10, is schematically illustrated for controlling or regulating the pressure of a liquid in a storage tank 12 to maintain it in a liquid state. As stated above, liquid in tank 12 can be pumped under all tank ambient conditions, whereby the tank includes an outlet 14 to a pump or pumps.

Generally, pressure control system 10 has various major components, including a supply of working fluid (gas), generally designated 6; conduit means 18 establishing fluid communication between the supply and the tank; supply regulator means, generally designated 20, in conduit 18 for maintaining a substantially constant pressure to the tank; tank regulator means, generally designated 22, in conduit 18 between supply regulator means 20 and tank 12 for selectively admitting the substantially constant pressure to the storage tank; and control means, generally designated 24, for selectively operating tank regulator means 22 in response to given conditions present in tank 12.

More particularly, supply 16 of working fluid includes a pair of storage tanks 26 for a pressurized gas, such as nitrogen. Supply tanks 26 are in communication with conduit means 18 by supply lines 28 which may include manual shut-off valves 30. A fill line 32 is provided from an appropriate source of nitrogen gas, under pressure, for filling supply tanks 22. A fill port 34, including a check valve **34*a*, is provided in fill line 32, along with a relief valve 36. Supply tanks 26** preferably are maintained in pressurized condition between 500 and 4,000 psi.

A filter 38 is provided in conduit 18 downstream of supply tanks 20, along with a bypass check valve 40 should the filter become clogged or defective.

Supply regulator means 20 is provided in conduit 18 for receiving the pressurized gas, as at an inlet **18*a*, at the aforesaid high pressure. In essence, the supply regulator means 20 is a differential pressure valve, the action of which is to maintain pressure at an outlet 18*b* leading toward tank 12 at a relatively constant working value, such as on the order of 365–420 psi. As stated heretofore, inlet pressure at 18*a* may vary from 500–4,000 psi.**

Specifically, the differential pressure valve of supply regulator means 20 includes a valve member 42 biased by a spring 44 against a valve seat 46. The differential pressure valve also includes a diaphragm 48 springloaded by a spring 50. The diaphragm is exposed to the outlet pressure (e.g. 400 psi) of outlet **18*b*. It can be seen that the area of the diaphragm is larger than the working area of valve member 42 and valve seat 46. Therefore, since the diaphragm is exposed to the outlet pressure, by selecting the spring rates, the downstream pressure from outlet 18*b*** of the differential pressure valve can be maintained at a substantially constant value (e.g. on the order of 364–420 psi). Should the pressure drop, the higher inlet pressure will pass through the valve up to the set constant pressure.

Tank regulator means 22 includes a flapper valve, generally designated 52, and a tank regulator, differential pressure valve, generally designated 54. The differential pressure valve includes a valve member 56 biased by a spring 58 against a valve seat 60. The spring is backed against a diaphragm 62 which closes off a valve chamber 64 which is in communication, as at 66, with flapper valve 54. Conduit 18 from supply regulator means 20 branches to an inlet 68 to flapper valve 52 and an inlet 70 to differential pressure valve 54.

Flapper valve 52 is operated by a torque motor 72 which moves a flapper valve member 74 between a fully closed position, as shown, and a fully open position wherein the flapper valve member 74 is to the left as viewed in the drawing. In full operative condition, the flapper valve will oscillate somewhere between the two extreme conditions, but there is a sufficient pressure drop through the flapper valve such that the main control of tank regulator means 22 comprises differential pressure valve 54.

More particularly, when flapper valve 52 is in closed condition, i.e. with valve member 74 in the position as shown, the pressure above and below diaphragm 62 will be equalized because of conduit line 76. In this condition, spring 58 will open valve member 56 to allow pressure from conduit 18 to pass through the valve. This would be a full flow condition. However, as stated above, the flapper valve member 74 most often will be oscillating somewhere between its two extreme positions.

When flapper valve member 74 is moved to its fully open position, i.e. to the left in the drawing, pressure in conduit 18 from supply regulator means 20 will be admitted to the top of diaphragm 62. Since the area of the diaphragm is larger than the working area of valve 56 and valve seat 60, the diaphragm effectively closes differential pressure valve 54. In essence, when flapper valve 52 is in its "closed" condition, differential pressure valve 54 is opened, and when flapper valve 52 is in its "open" condition, differential pressure valve 54 effectively is closed.

Control means 24 includes a controller 78 coupled to torque motor 72 of flapper valve 52, as at 80. The controller, through line 82, senses the temperature in tank 12. A pressure feedback device communicates tank pressure back to the controller by line 83. The controller may be of a microprocessor or other appropriate type which calculates or determines pressure values as a function of the temperature in the tank. In other words, the temperature of the tank is measured and a corresponding pressure is determined which will be sufficient to maintain the fluid in tank 12 in a liquid state. This information is used to control flapper valve 52 by means of torque motor 72, which permits the control pressure to pass through differential pressure valve 54.

A check valve 84 is provided in conduit 18 between tank regulator means 22 and tank 12. This check valve is required if the liquid in the tank is of a corrosive nature to prevent mixing of the corrosive material upstream of the system. An alternative might be to place a bladder within tank 12 to separate the liquid from the vapor while not influencing the pressure controlling system. A relief valve 86 also is provided in communication with tank 12.

Lastly, a three-way solenoid valve, generally designated 88, is provided upstream of supply regulator means 20. This valve is provided for completely closing the entire system, such as when an aircraft is on the ground or should there be a failure upstream, as well as to provide a vent position, as shown, to reduce the energy state in the system and vent pressure through an outlet 90.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A pressure control system for maintaining a fluid in a liquid state in a storage tank and the like, comprising:
- a closed storage tank;
- a supply of working fluid under pressure;
- conduit means establishing fluid communication between the supply and the closed storage tank;
- supply regulator means in the conduit means for maintaining a substantially constant pressure to the storage tank;
- tank regulator means in the conduit means between the supply regulator means and the storage tank for selectively admitting said substantially constant pressure to the storage tank; and
- control means for selectively operating the tank regulator means in response to given conditions present in the storage tank.

2. The pressure control system of claim 1 wherein said supply regulator means comprises a differential pressure valve.

3. The pressure control system of claim 1 wherein said tank regulator means include a differential pressure

4. The pressure control system of claim 3 wherein said tank regulator means include a flapper valve for selectively admitting said substantially constant pressure to the differential pressure valve.

5. The pressure control system of claim 4 wherein said control means are operatively connected to the flap per valve.

6. The pressure control system of claim 1 wherein said control means include means responsive to temperature conditions in the storage tank.

7. A pressure control system for maintaining a fluid in a liquid stage in a storage tank and the like, comprising:
- a closed storage tank;
- a supply of working fluid under pressure;
- conduit means establishing fluid communication between the supply and the closed storage tank;
- first differential pressure valve in the conduit means for maintaining a substantially constant pressure to the storage tank;
- tank regulator means including a second differential pressure valve and a flapper valve for selectively admitting said substantially constant pressure to the second differential pressure valve, the tank regulator means being in the conduit means between the supply regulator means and the storage tank for selectively admitting said substantially constant pressure to the storage tank; and control means for selectively operatively the tank regulator means in response to given conditions present in the storage tank.

8. The pressure control system of claim 7 wherein said control means are operatively connected to the flapper valve.

9. The pressure control system of claim 8 wherein the flapper valve is torque motor operated and the control means include electronic means for operating the torque motor.

10. The pressure control system of claim 7 wherein said control means include means responsive to temperature conditions in the storage tank.

11. A pressure control system for maintaining a fluid in a liquid state in a storage tank and the like, comprising:

a closed storage tank;

a supply of working fluid under pressure;

conduit means establishing fluid communication between the supply and the closed storage tank;

first valve means in the conduit means for maintaining a substantially constant pressure to the storage tank;

second valve means in the conduit means between the first valve means and the storage tank for admitting said substantially constant pressure to the storage tank;

third valve means for selectively admitting said substantially constant pressure to the second valve means; and control means for selectively operating the third valve means in response to given conditions present in the storage tank.

12. The pressure control system of claim 11 wherein said control means are operatively connected to the third valve means.

13. The pressure control system of claim 12 wherein said third valve means is torque motor operated and said control means include electronic means for controlling the torque motor.

14. The pressure control system of claim 11 wherein said control means include means responsive to temperature conditions in the storage tank.

15. A pressure control system for maintaining a fluid in a liquid state in a storage tank and the like, comprising:

a closed storage tank;

a supply of working fluid under pressure;

conduit means establishing fluid communication between the supply and the closed storage tank;

regulator means in the conduit means for maintaining a substantially constant pressure to the storage tank, including control means for selectively operating the regulator means in response to temperature conditions in the storage tank.

* * * * *